Aug. 6, 1929.  B. A. PETERSON  1,723,438
GASOLINE GAUGE
Filed Nov. 28, 1924
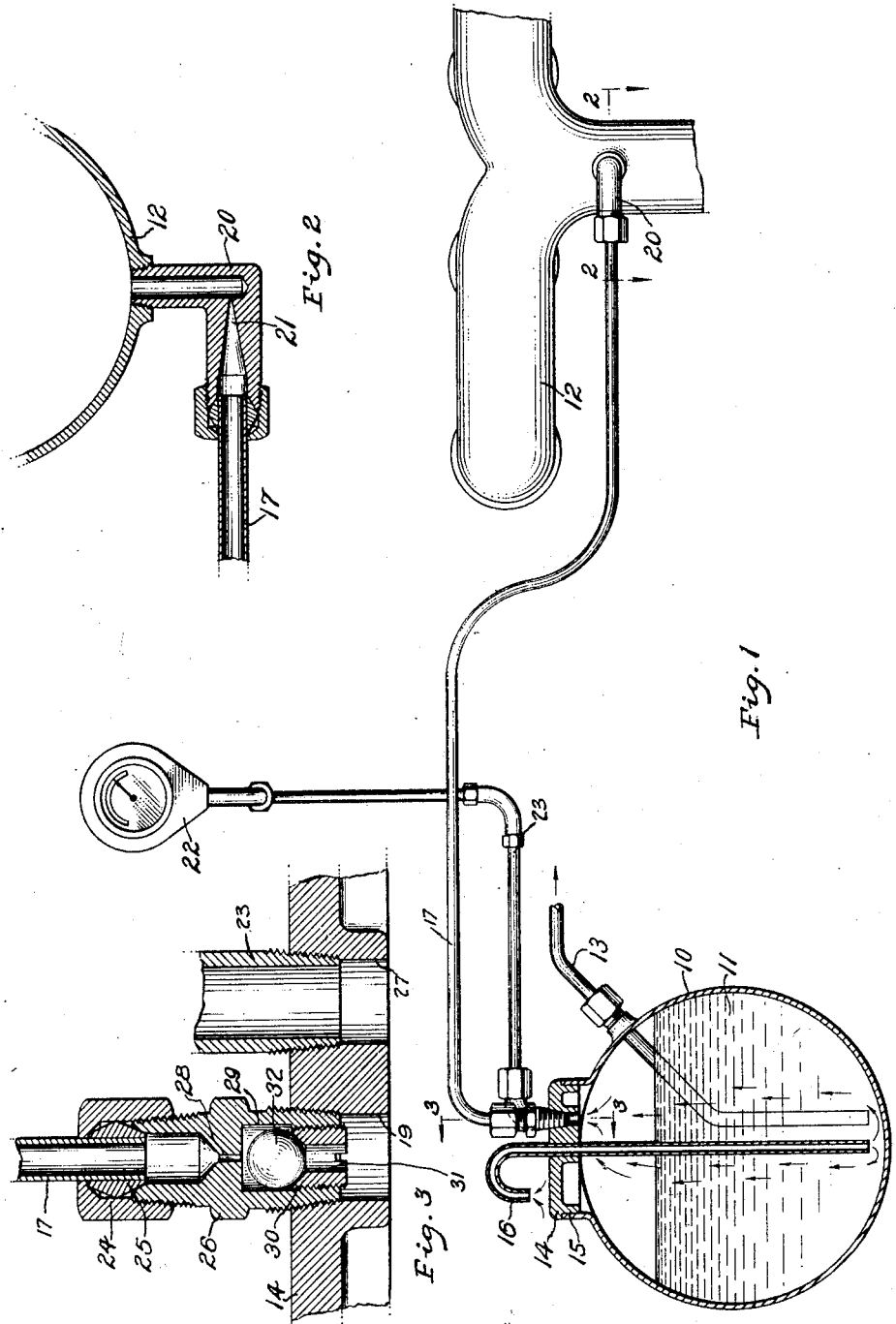
Inventor,
Burt A. Peterson
By Churchill Parker Railson
Attys.

Patented Aug. 6, 1929.

1,723,438

UNITED STATES PATENT OFFICE.

BURT A. PETERSON, OF ROCKFORD, ILLINOIS, ASSIGNOR TO BARBER-COLMAN COMPANY, OF ROCKFORD, ILLINOIS, A CORPORATION OF ILLINOIS.

GASOLINE GAUGE.

Application filed November 28, 1924. Serial No. 752,741.

The invention relates to improvements in gauges, and has particular reference to a gauging device adapted to be used on automobiles.

The primary object of the invention is to provide means for preventing the entrance of gasoline or other liquids into the pipe leading to the exhausting device that maintains the pressure in the tank proportional to the level of the gasoline.

Another object is to provide a novel and improved gasoline gauge which is simple and practical in construction, and accurate in operation.

Ancillary objects and advantages will become apparent as the description proceeds.

In the accompanying drawings, Figure 1 is a view of a gasoline gauge embodying the features of my invention.

Fig. 2 is a sectional view taken along line 2—2 of Fig. 1.

Fig. 3 is a fragmentary sectional view taken along line 3—3 of Fig. 1.

While my invention is susceptible of various modifications and alternative constructions, I have shown in the drawings and will herein describe in detail, the preferred embodiment, but it is to be understood that I do not thereby intend to limit the invention to the specific form disclosed but aim in the appended claims to cover all modifications and alternative constructions falling within the spirit and scope of the invention.

Referring to the exemplary embodiment of the invention, 10 represents a fuel tank containing the liquid fuel such as the gasoline 11, and 12 indicates the intake manifold of an internal combustion engine. Gasoline is withdrawn from the tank 10 through a feed pipe 13 which is connected with the engine carburetor (not shown).

The tank 10 is preferably air-tight, and is closed by a removable cap 14 fitting into an opening 15. A vent tube 16 bent downwardly at its outer end to prevent the entrance of foreign matter into the tank 10, extends through the cap 14 and into the gasoline to a point slightly above the bottom of the tank. The vent tube 16 takes the place of the vent in the customary cap which closes the filling opening (not shown), and permits the inflow of air as gasoline is withdrawn through the pipe 13. In the absence of air leakage into the tank, the pressure above the gasoline 11 will vary as the gasoline is withdrawn, and will equal atmospheric pressure minus the weight of the column of liquid in the tube 16.

To reduce the pressure above the liquid 11 after filling the tank 10 or after starting the engine to a value corresponding to the volume of liquid present, and to maintain such pressure relation at all times, the tank 10 is connected through a pipe 17 to the intake manifold 12. One end of the pipe 17 is attached to a fitting 26 threaded into a bore 19 in the cap 14, and the other end is secured to an elbow 20 threaded into the intake manifold 12. The elbow 20 is provided with a restricted passageway 21 to limit the flow of air therethrough and to prevent sudden pressure fluctuations in the tank 10. The vacuum within the intake manifold 12 when the engine is running induces a small but continual flow of air through the vent tube 16 and pipe 17. If the pressure within the tank 10 is lower than that corresponding to the level of the gasoline, sufficient air will pass through the tube 16 into the tank 10 as indicated by the arrows, to bring the pressure up to the correct value. If, on the other hand, the pressure within the tank is higher than it should be, as it is immediately after filling the tank 10 or after the engine has been at rest, air will be withdrawn through the pipe 17 without being replaced until the surplus has been removed. Thus the internal pressure of the tank is always proportional to and accurately represents the volume of the gasoline in the tank 10 when the engine is in operation.

The pressure within the tank 10 is measured by a suitable gauge or indicating device 22 which can be conveniently secured to the dash of the automobile if desired. This device is connected with the tank 10 through a suitable pipe line 23.

Means is provided for preventing gasoline from rushing into the pipe line 17 as it otherwise would when driving the automobile around a corner or over a rough road.

To this end, the pipe 17 is tightly connected to the fitting 26 by a wedge nut 24 and gland 25. The fitting 26 is formed with a restricted passage 28, the lower end of which constitutes a valve seat and opens into a relatively enlarged chamber 29, Threaded into the lower end of the fitting 26 to partially close the chamber 29 is a plug 30 having a central passage 31 beveled at its inner end. A ball 32 is loosely seated on the plug 30 over the passage 31 so as to allow air to filter from the tank to the passage 28, and upon an influx of gasoline the ball is adapted to be moved upwardly to close the passage 28. The passage 28 is so proportioned to the size of the ball 32 that the weight of the latter will cause it to fall against the pull of the suction in the line 17 when the rush of gasoline has ceased. To obtain this result, the passage 28 is preferably considerably restricted in size relative to the size of the ball. The chamber 29 is sufficiently large to prevent the air flowing to the intake manifold 12 as the level of the gasoline 11 is lowered from raising the ball against the passage 28. The floating ball valve just described thus will allow gas or air to pass through the pipe line 17 and the passage 31, but will prevent the entrance of liquids or gasoline.

It will be seen that I have provided a novel and improved means for measuring the volume of liquid in an automobile fuel tank, which means is simple in construction and accurate and efficient in operation. Liquids are prevented from entering the line 17, thereby permitting an uninterrupted flow of air therethrough and preventing the admission of fuel to the intake manifold through said line.

I claim as my invention:

1. A gauging device having, in combination with a closed fuel tank provided with an opening above the normal liquid level therein and the intake manifold of an internal combustion engine, a cap tightly closing the opening in the tank, a vent tube extending through said cap and nearly to the bottom of said tank, a pipe connecting the interior of said tank above said liquid with said manifold, a floating ball valve in said pipe adjacent its connection with the tank to allow air to flow to said intake manifold but adapted to prevent the entrance of liquid into said pipe by splashing, and pressure indicating means connected to said tank above the normal level of the liquid therein.

2. A gauging device having, in combination with a closed liquid supply tank, means including a suction line having a fitting therein adjacent to said tank and connecting said line to said tank above the normal liquid level therein, said means being operable to maintain the gas pressure in said tank proportional to the level of liquid therein, means for measuring said pressure, said fitting being formed with a chamber adjacent said tank, with a restricted valve passage opening into the upper end of said chamber, and with a valve passage opening from said tank into the lower end of said chamber and formed with a valve seat at its upper end, and valve means loosely positioned in said chamber and movable selectively to substantially close either of said passages, said valve being adapted to be moved by gravity to close the passage to said tank and to be moved by impact of the liquid to close said restricted valve passage.

3. A gauging device having, in combination with a closed liquid fuel tank, a vent tube extending into said tank and nearly to the bottom thereof, means for exhausting air from said tank, a fitting threaded into said tank above the normal level of liquid therein, a pipe line connecting said means and said fitting having a restricted valve passage and a chamber adjacent said tank, a plug threaded into the lower end of said chamber, said plug having a valve passage in alinement with said first mentioned passage, a ball in said chamber adapted normally to substantially close said lower passage and arranged to permit gradual passage of air from said tank, said ball also being adapted to be moved into closing relation with said restricted upper passage by the splashing of liquid through said lower passage into contact with said ball, and a pressure indicating device connected to the top of said tank so as to indicate the pressure in the space above the liquid in said tank.

4. A gauging device having, in combination with a closed liquid supply tank, means for drawing air from said tank, means adapted to admit air to the lower side of said tank beneath the liquid, a fitting adjacent said tank having an enlarged chamber and a restricted valve passage communicating with the interior of said tank above the normal liquid level therein, means connecting said first mentioned means to said fitting, a ball loosely mounted in said chamber and adapted to be moved to close said valve passage by the splashing of the liquid in said tank against said ball, and a pressure indicating means connected to said tank above the normal level of the liquid therein.

In testimony whereof, I have hereunto affixed my signature.

BURT A. PETERSON.